US010635951B1

(12) United States Patent
Liu et al.

(10) Patent No.: US 10,635,951 B1
(45) Date of Patent: Apr. 28, 2020

(54) FAST COMPUTATION OF A CONVOLUTIONAL NEURAL NETWORK (71) Applicant: Alibaba Group Holding Limited, George Town (KY)

(72) Inventors: Yongchao Liu, Hangzhou (CN); Qiyin Huang, Hangzhou (CN); Guozhen Pan, Hangzhou (CN); Sizhong Li, Hangzhou (CN); Jianguo Xu, Hangzhou (CN); Haitao Zhang, Hangzhou (CN); Lin Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,042

(22) Filed: Apr. 22, 2019

Related U.S. Application Data (63) Continuation of application No. PCT/CN2018/111655, filed on Oct. 24, 2018.

(51) Int. Cl.
G06N 3/04 (2006.01)
G06T 15/00 (2011.01)
G06F 17/16 (2006.01)
G06N 3/06 (2006.01)
G06F 17/15 (2006.01)
G06N 20/00 (2019.01)
(Continued)

(52) U.S. Cl.
CPC .............. G06K 9/66 (2013.01); G06N 3/04 (2013.01); G06N 3/08 (2013.01)

(58) Field of Classification Search
CPC .............. G06K 9/66; G06N 3/04; G06N 3/08
USPC ...................................................... 706/1–62
See application file for complete search history.

(56) References Cited

U.S. PATENT DOCUMENTS

2017/0344876 A1 11/2017 Brothers
2018/0101763 A1 4/2018 Barnard et al.
2018/0293777 A1* 10/2018 Sarel .................... G06N 3/0454
(Continued)

FOREIGN PATENT DOCUMENTS

CN 107844833 3/2018
RU 2651147 4/2018
WO WO 2018081126 5/2018

OTHER PUBLICATIONS

Lavin et al., "Fast Algorithms for Convolutional Neural Networks,". Proceedings of the IEEE Conference on Computer Vision and Pattern Recognition 2016, 9 pages.
(Continued)

Primary Examiner — Brandon S Cole
(74) Attorney, Agent, or Firm — Fish & Richardson P.C.

(57) ABSTRACT

A computer-implemented method includes obtaining a trained convolutional neural network comprising one or more convolutional layers, each of the one or more convolutional layers comprising a plurality of filters with known filter parameters; pre-computing a reusable factor for each of the one or more convolutional layers based on the known filter parameters of the trained convolutional neural network; receiving input data to the trained convolutional neural network; computing an output of the each of the one or more convolutional layers using a Winograd convolutional operator based on the pre-computed reusable factor and the input data; and determining output data of the trained convolutional network based on the output of the each of the one or more convolutional layers.

17 Claims, 4 Drawing Sheets (51) Int. Cl.
*G06K 9/66* (2006.01)
*G06N 3/08* (2006.01)

(56) References Cited

U.S. PATENT DOCUMENTS

2019/0042923 A1* 2/2019 Janedula .................. G06N 3/04
2019/0130250 A1* 5/2019 Park ..................... G06F 17/156
2019/0179869 A1* 6/2019 Park ....................... G06N 20/00

OTHER PUBLICATIONS

Winograd, "On multiplication of polynomials modulo a polynomial," SIAM Journal on Computing, 1980, 9(2):225-229.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

FIG. 1

$P = N [H/m] [W/m]$
$\alpha = m + r - 1$
$x_{c,p} \in R^{\alpha \times \alpha}$
$w_{o,c} \in R^{r \times r}$
$W, B^T, \text{and } A^T$
$Y_{o,p} \in R^{m \times m}$

210 Pre-computation
1: for $o = 0$ to $C_{out}$ do
2:   for $c = 0$ to $C_{in}$ do
3:     $u = W w_{o,c} W^T \in R^{\alpha \times \alpha}$
4:     Save $u$ to tensor $U$: $U_{o,c}^{(\xi,\nu)} = U_{\xi,\nu}$
5:   end for
6: end for

220
7: for $o = 0$ to $P$ do
8:   for $c = 0$ to $C$ do
9:     $v = B^T x_{c,p} B \in R^{\alpha \times \alpha}$
10:     Save $v$ to tensor $V$: $V_{c,p}^{(\xi,\nu)} = V_{\xi,\nu}$
11:   end for
12: end for
13: for $\xi = 0$ to $\alpha$ do
14:   for $\nu = 0$ to $\alpha$ do
15:     $M^{(\xi,\nu)} = U^{(\xi,\nu)} V^{(\xi,\nu)}$
16:   end for
17: end for
18: for $o = 0$ to $C_{out}$ do
19:   for $p = 0$ to $P$ do
20:     Retrieve $m$ from tensor $M$ $m$: $m_{\xi,\nu} = M_{o,p}^{(\xi,\nu)}$
21:     $Y_{o,p} = A^T m A$
22:   end for
23: end for

FAST COMPUTATION OF A CONVOLUTIONAL NEURAL NETWORK

CROSS-REFERENCE TO RELATED APPLICATIONS

This application is a continuation of PCT Application No. PCT/CN2018/111655, filed on Oct. 24, 2018, which is hereby incorporated by reference in its entirety.

BACKGROUND

A convolutional neural network (CNN or ConvNet) is a type of artificial neural network in machine learning. It is commonly used in analyzing visual imagery, for example, image recognition and classification. For example, in a training phase of a machine learning process, a CNN can be trained or learned based on training data. Then, in a prediction phase of a machine learning process, the trained CNN serves as a model that receives input data and outputs predictions or decisions based on processing and analyzing the input data.

SUMMARY

The present disclosure describes fast computation of a convolutional neural network (CNN).

In an implementation, a computer-implemented method includes obtaining a trained convolutional neural network including one or more convolutional layers, each of the one or more convolutional layers including a number of filters with known filter parameters; pre-computing a reusable factor for each of the one or more convolutional layers based on the known filter parameters of the trained convolutional neural network; receiving input data to the trained convolutional neural network; computing an output of the each of the one or more convolutional layers using a Winograd convolutional operator based on the pre-computed reusable factor and the input data; and determining output data of the trained convolutional network based on the output of the each of the one or more convolutional layers.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the described subject matter elevates a CNN model by performing equivalent transformation or conversion of a computational graph to streamline the network structure of the CNN, and thus allows optimization of implementation of the CNN in both device-independent and device-dependent manner. Example device-independent optimizations can include redundant operation removal (e.g. removing identify operators in a deep learning framework, which only performs data transmission from the input tensor to the output tensors with no change of data content), and layer/operation merging to reduce computational complexity (e.g., merging a convolutional layer with a batch normalization layer). Example device-dependent optimizations can include improving hardware efficiency by merging operations (e.g., merging a convolutional layer with a bias addition operation that immediately follows the former) to better exploit hardware computing capability and flexible deploying operations on different underlying architectures to maximize CNN throughput. Second, the described subject matter reduces the computation load of data prediction based on a trained CNN and improves the prediction speed, and thus reduces network latency and improves throughput of the CNN. Third, the described subject matter requires less computation power. Fourth, the described subject matter can combine multiple operators into a new operator to take advantage of underlying hardware accelerators (such as GPUs, FPGAs or ASIC chips). For example, in CNN, a convolutional layer is typically followed by a bias addition operation or a batch normalization layer. In the case of a bias addition operation, if considering the convolution and bias addition as two separate operations, the convolution can be computed on GPUs and then bias values can be added to the results of the preceding convolution on GPUs. In this way, the computing capability of GPUs are not fully exploited because of the small amount of computation in bias addition operation. Instead, in the described subject matter, the convolution and bias addition operations can be combined into a single one in some implementations. In this single operation, the corresponding bias value can be added to the result of convolution directly in the same GPU kernel launch, thus leading to better speed. Similarly, in the case of batch normalization, the combination of a convolutional layer and a batch normalization can be equivalently transformed into a combination of a convolutional layer and a bias addition offline, and then the aforementioned device-dependent optimizations can be applied on convolutional layers and bias addition operations to further take advantage of GPU power to improve computation speed. These examples are applicable as well to other processors or accelerators than GPUs. Other advantages will be apparent to those of ordinary skill in the art.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes fast computation of a convolutional neural network (CNN), and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A convolutional neural network (CNN or ConvNet) is one of the most representative network structures and technological innovations for deep learning. It has achieved great success in the field of imagery and is also widely used to solve problems in other fields. A CNN can include one or more of an input layer, a convolutional layer, an activation function, a batch normalization, a pooling layer, a fully connected layer, and an output layer. Among them, the convolutional layer typically involves the most computational load and may consume the longest computation time of the entire CNN. A convolutional layer can include one or more filters (also referred to as kernels). The convolutional layer can receive input data, perform a convolution operation of the input data with each of one or more filters of the convolutional layer, and generate output data of the convolutional layer. In some instances, a CNN can include tens of convolutional layers.

The described techniques can help accelerate the convolution operation, which is the core operation of the convolutional layer. In turn, the described techniques can improve the computational efficiency and reduce the computational load of a CNN.

The described techniques can have a variety of applications. For example, the described techniques can be applied in face recognition in areas such as unmanned supermarkets, unmanned banks, security protection, and smart cities. For example, deep convolutional neural networks have been used in face recognition. The described techniques can help deal with tasks of face identification, especially among a large population. The described techniques can improve response time of face recognition based on a trained CNN model. The described techniques can reduce the processing time of each request of face recognition. In turn, system throughput can be increased and operation costs can be reduced without increasing computing resources.

As another example, the described techniques can be used in auto insurance. The described techniques can automatically identify a surface damage of a vehicle based on deep convolutional neural network image technology. For example, after a car accident, the car surface damage can be photographed, and then uploaded to an insurance company's claim server, which can perform automatic damage identification and compensation quota valuation. The described techniques can be used by the insurance claim server to perform automatic damage identification based on deep convolutional neural network technology. The described techniques can allow the insurance company to provide faster and higher throughput without increasing equipment budget.

Aside from the above-discussed example, the described techniques can benefit many other applications that make use of the CNN technology.

In some implementations, the described techniques can be implemented using a computational graph. Computational graphs can be used to represent machine learning algorithms, especially in the field of deep learning. A computational graph can be a directed graph that includes multiple nodes, where the nodes correspond to operations or variables. Variables can feed their value into operations, and operations can feed their output into other operations. This way, the node in the computational graph can define a function of the variables. The values that are fed into the nodes (i.e., input) and come out of the nodes (i.e., output) can be represented by tensors. A tensor can be regarded as a multi-dimensional array. A tensor can encompass scalars, vectors, matrices, and tensors of a higher rank or dimensions. Using tensors to represent input and output data of the variable and operator can help achieve automatic differentiation, dynamic memory management, and other functionalities.

For an operator, the computational graph only needs to define the function of the operator. It is not necessary to specify the specific implementation of each operator. Therefore, the computational graph provides the flexibility such that the operator can be executed or otherwise implemented on one or more of a CPU or a hardware accelerator such as GPU, FPGA, or AI chip. The storage and access to the data variables can be either local or remote. Computational graphs can be used for model training, model prediction or inference, or other phases of a machine learning process.

Figure 1:
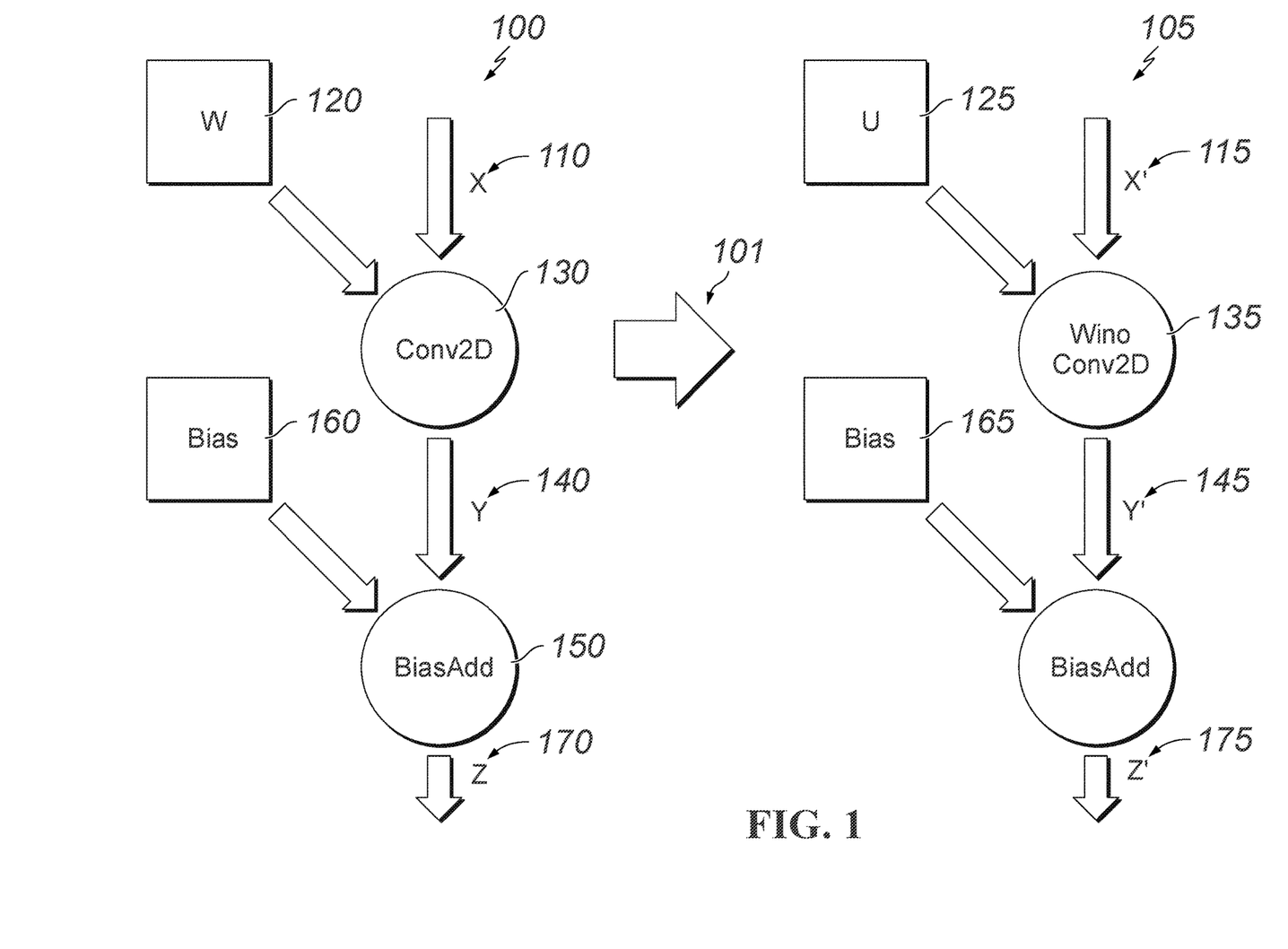
FIG. 1 is a block diagram illustrating an example equivalent transformation of two computational graphs of a convolutional neural network (CNN), according to an implementation of the present disclosure.

FIG. 1 is a block diagram illustrating an example equivalent transformation 101 of two computational graphs 100 and 105 of a CNN, according to an implementation of the present disclosure. The two computational graphs 100 and 105 can represent the same CNN. For simplicity, the two computational graphs 100 and 105 illustrate operations or functions of a single convolutional layer of the CNN. A CNN can include multiple layers and can be represented by a computational graph accordingly.

As illustrated, tensor X 110 is an input and tensor Z 170 is an output of the convolutional layer of the CNN represented by the computational graph 100, respectively. The computational graph 100 includes two nodes 130 and 150. Each node corresponds to a variable or an operator, which can be regarded as a fine-grained basic operation of a neural network. The node 130 represents a convolution operator, Conv2D. The Conv2D 130 can represent the convolution operation of the input data tensor X 110 with a tensor W 120, where the tensor W 120 represents weights or parameters of filters of the convolutional layer of the CNN. After the convolution operation, the Conv2D 130 can output tensor Y 140. The output tensor Y 140 and a bias 160 can serve as the input to the node 150, which represents the operation of adding the bias 160 to the output data Y 140, resulting in the output Z 170 of the convolutional layer of the CNN.

Similarly, tensor X' 115 is an input and tensor Z' 175 is an output of the convolutional layer of the CNN represented by the computational graph 155, respectively. The computational graph 155 includes two nodes 135 and 155. The node 135 represents a convolution operator, Wino-Conv2D. The Wino-Conv2D 135 can represent a modified convolution operation of the input data tensor X' 115 with a tensor W 125, where the tensor W 125 represents modified weights or parameters of filters of the convolutional layer of the CNN. After the convolution operation, the Wino-Conv2D 135 can output tensor Y' 145. The output tensor Y' 145 and a bias 165 can serve as the input to the node 155, which represents the operation of adding the bias 165 to the output data Y' 145, resulting in the output Z' 175 of the convolutional layer of the CNN.

In some implementations, the computational graph 105 is an equivalent transformation of the computational graph 100. Given the same input (i.e., X 110=X' 115), the two computational graphs 100 and 105 can generate the same output (i.e., Z 170=Z' 175).

In some implementations, compared to the computational graph 100, the computational graph 105 can represent an improved or optimized convolution operation for fast computation of the CNN. For example, after a training phase of a machine learning process, parameters of the nodes (e.g., the values of filter or kernel parameter in the tensor W 120 or tensor U 125) of the computational graph have been trained and known. In the prediction phase of a machine learning process, the values of these parameters remain unchanged. In other words, no matter how the input tensor X' 115 changes, the value of the tensor U 125 will not change. As such, the tensor U 125 can be computed after the training, before performing prediction based on any input data X' 115. By computing the tensor U 125 in advance and reusing the pre-computed tensor U 125 for any input data X' 115 to the convolutional layer of the CNN, the computational load of the CNN can be reduced, especially for prediction of multiple input to a CNN.

As such, in the computational graph 105, the new convolution operator Wino-Conv2D 135 can replace the original convolution operator Conv2D 130 in the original computational graph 100. The new convolution operator Wino-Conv2D 135 uses the tensor U 125 instead of the original tensor W 120 as the filter or kernel parameter. The computational graph 105 can achieve improved computational efficiency while preserving the equivalence with the original computational graph 100.

Figure 2:
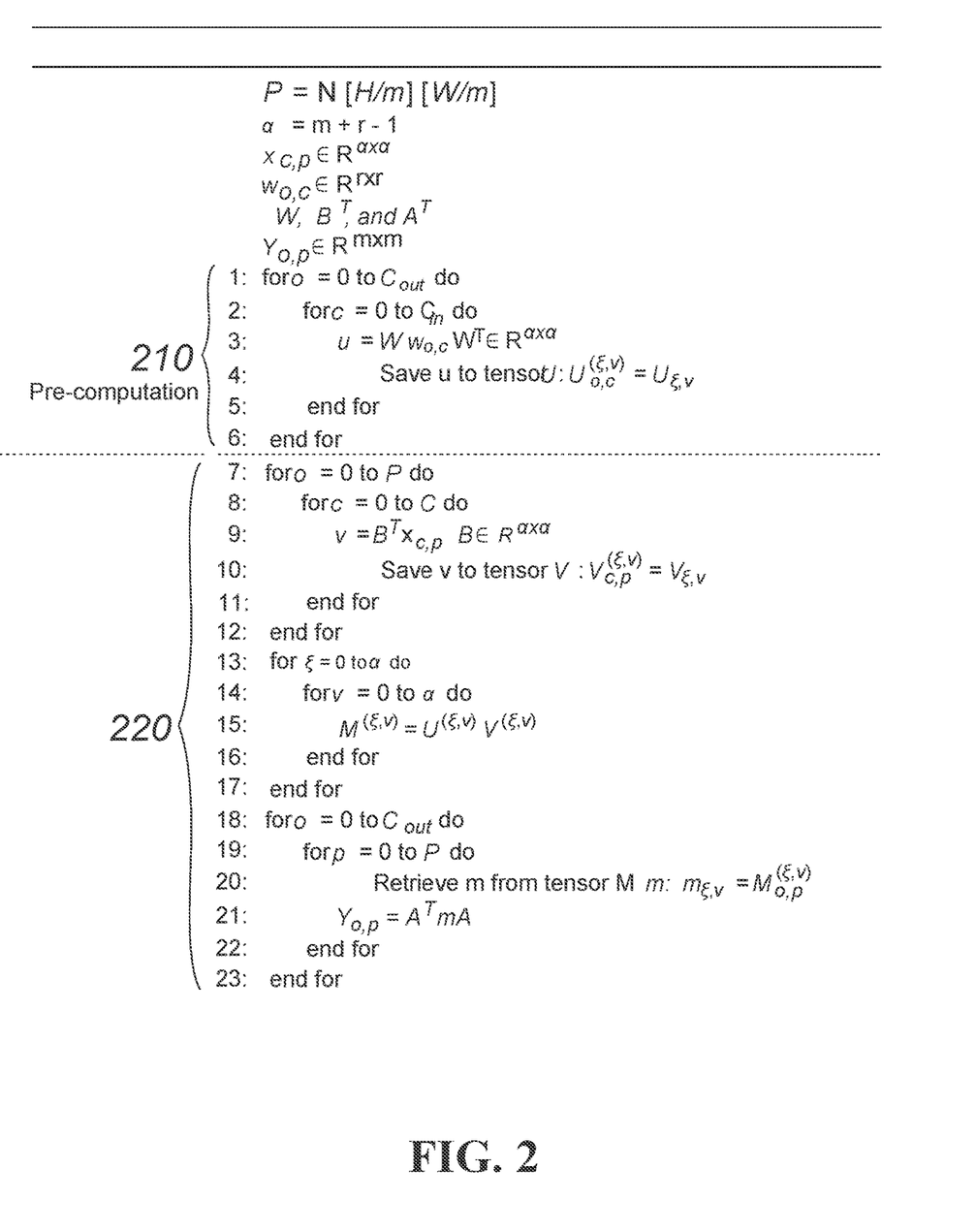
FIG. 2 is a screenshot illustrating an example pseudorandom code of fast computation of a CNN, according to an implementation of the present disclosure.

FIG. 2 is a screenshot illustrating an example pseudo code of an example algorithm 200 for fast computation of a CNN, according to an implementation of the present disclosure. The example algorithm 200 is based on Winograd minimal filtering algorithm, a fast algorithm for CNNs.

The convolution operation of a convolutional layer of the CNN can be defined as a specified correlation between an input (e.g., represented by an input tensor X) and a filter or kernel of the convolutional layer (represented by a filter or kernel tensor W), resulting in an output (e.g., represented by an output tensor Y). For simplicity, consider the convolution operation uses a stride of 1. For a given convolutional layer, the input tensor X can have a size of [N; $C_{in}$; H; Wi], where N represents a batch size of input data to be processed (e.g., a batch operation of N images to be convolved); Cm represents the number of channels (e.g., an image from a standard digital camera has three channels red, green, and blue. Each channel can include a 2d matrix having pixel values (e.g., in the range of 0 to 255)); H and Wi represent the height and width of each channel (e.g., 255*255), respectively. The filter or kernel tensor W can have a size of [$C_{out}$; $C_{in}$; R; S], wherein $C_{out}$ represents the number of output channels of the convolution operation; Cm represents the number of input channels of the convolution operation; R and S represent the height and width of each filter or kernel of the convolutional layer, respectively. Typically, R and S can be set to have the same value.

The output tensor Y can have a size of [N; $C_{out}$; H; Wi], with element $$Y_{i,o,x,y} = \sum_{c=1}^{C_{in}} \sum_{u=1}^{R} \sum_{v=1}^{S} X_{i,c,y+u,x+v} W_{o,c,u,v} \quad (1)$$

where i is an integer from the range of [0, N) and o is an integer from the range of [0, $C_{out}$).

There are several ways to implement a convolution operation of a convolutional layer, such as calculation by definition (e.g., as given by Equation (1)), conversion to matrix multiplication, or using Winograd fast algorithm. For example, when the size of each convolution kernel or filter is 1×1 (that is, R and S are equal to 1 at the same time), the above convolution operation can be converted to matrix multiplication. In some implementations, for example, in cases where R>1 or S>1, the convolution operation can be implemented based on Winograd fast algorithm.

According to the Winograd fast algorithm, for convolution of an input channel with a convolution filter or kernel with a size of r×s and an output size of m×n, a minimal filtering algorithm F(m×n; r×s) can be found that only requires (m+r−1)(n+s−1) multiplications to complete the convolution operation. For example, a given input channel of size H×Wi can be divided into overlapping sub-blocks, each sub-block having a size of m×n. A convolution calculation can be performed on each sub-block separately to generate the corresponding output channel (recall the above assumption of the stride being 1). As described above, the width R and height S of the convolution filter or kernel in the convolution layer are generally set to the same value. Typically, for sub-block partitioning, m and n are set to the same values as well.

For simplicity, the example algorithm 200 considers the case where m=n and r=s. That is, a minimal filtering algorithm F(m m; r r) is considered. The steps 1-23 of the example algorithm 200 show an example implementation of the Winograd algorithm for a convolution operation of a single convolutional layer of a CNN. The CNN is characterized by $\omega_{o,c} \in R^{r \times r}$, the filter or kernel between the $c^{th}$ input channel and $o^{th}$ output channel, and a tensor W including parameters or weights of the filters or kernels of the CNN. Tensor X represents the input data to the CNN.

$$P = N \left\lceil \frac{H}{m} \right\rceil \left\lceil \frac{Wi}{m} \right\rceil$$

represents the number of input channels. α=m+r−1 represents the size of input sub-block (adjacent sub-blocks have r−1 overlapping elements). $x_{c,p} \in R^{\alpha \times \alpha}$ represents the $p^{th}$ sub-block of the $c^{th}$ input channel. $Y_{o,p} \in R^{\alpha \times \alpha}$ represents the $p^{th}$ sub-block of the $o^{th}$ output channel. $B^T$ and $A^T$ are transform matrices corresponding to input X, and given by:

$$A^T = \begin{bmatrix} 1 & 1 & 1 & 0 \\ 0 & 1 & -1 & -1 \end{bmatrix} \quad (2)$$

and $$B^T = \begin{bmatrix} 1 & 0 & -1 & 0 \\ 0 & 1 & 1 & 0 \\ 0 & -1 & 1 & 0 \\ 0 & 1 & 0 & -1 \end{bmatrix} \quad (3)$$

In existing techniques for computation of a CNN based on the Winograd algorithm, the example algorithm 200 (including steps 1-23) is executed for each input channel (e.g., a channel of an image) for each convolutional layer of the CNN. For example, if a CNN includes 5 convolutional layers, for each input channel, the example algorithm 200 is executed 5 times. If 10 channels are input for prediction, the example algorithm 200 will be executed 50 times.

Unlike the existing techniques, the described techniques for fast computation of a CNN can reduce the computation load, especially given multiple input channels. The described techniques for fast computation of a CNN can reuse factors that are common and unchanged during the prediction phase of a machine learning process. The described techniques for fast computation of a CNN identify such factors and pre-compute them.

As such, the computation of those reusable factors only needs to be computed once, regardless of the values of the input data. More specifically, in the example algorithm 200, the described fast computation algorithm can pre-compute the tensor U according to steps 1-6 because all the parameters needed for such a computation (e.g., W and $\omega_{o,c}$) are known given a trained CNN and remain unchanged during the prediction phase based on the trained CNN. For example, the tensor U can be extracted from the tensor W by offline processing. Accordingly, the steps 1-6 (collectively denoted as 210) of the example algorithm 200 only need to be executed once for each convolutional layer of the trained CNN. For example, if 10 channels are input for prediction, the steps 1-6 of the example algorithm 200 can only be executed once to reduce the amount of computation in real-time model prediction, thereby reducing runtime, while the remaining steps 7-23 (collectively denoted as 220) are executed 10 times for each convolutional layer of the trained CNN.

With the pre-computed tensor U based on the example Winograd algorithm 200, the computational graph of the trained CNN can be modified, for example, according to the equivalent transform 101, to the computational graph 105, as shown in FIG. 1. For instance, the pre-computed tensor U based on the example Winograd algorithm 200 can be an example of the tensor U 125, which replaces the original weight tensor W 120 of a trained CNN. The convolution operator Wino-Conv2D 135 can be implemented based on steps 7-23 of the example Winograd algorithm 200, which replaces the original convolution operator Conv2D 130 in the original computational graph 100. The modified computational graph 105 can be used for prediction. Since the new computational graph 105 relieves the original computational graph 100 from the calculation of the tensor U 125, the computational load of modified computational graph 105 is reduced, and thus improves the computational efficiency for performing the convolution operation of a CNN. Simulation results have shown that the computation based on the modified computational graph 105 with the pre-computed U 125 and the convolution operator Wino-Conv2D 135 can improve the computation speed as much as 30% compared to the computational graph 100 with the original weight tensor W 120 and the convolution operator Conv2D 130.

Note that FIG. 2 shows an example Winograd algorithm for the case of m=n and r=s. The described techniques for fast computation of a CNN can be adapted and applied to other cases including generic CNNs without specific requirements of m=n and r=s.

Figure 3:
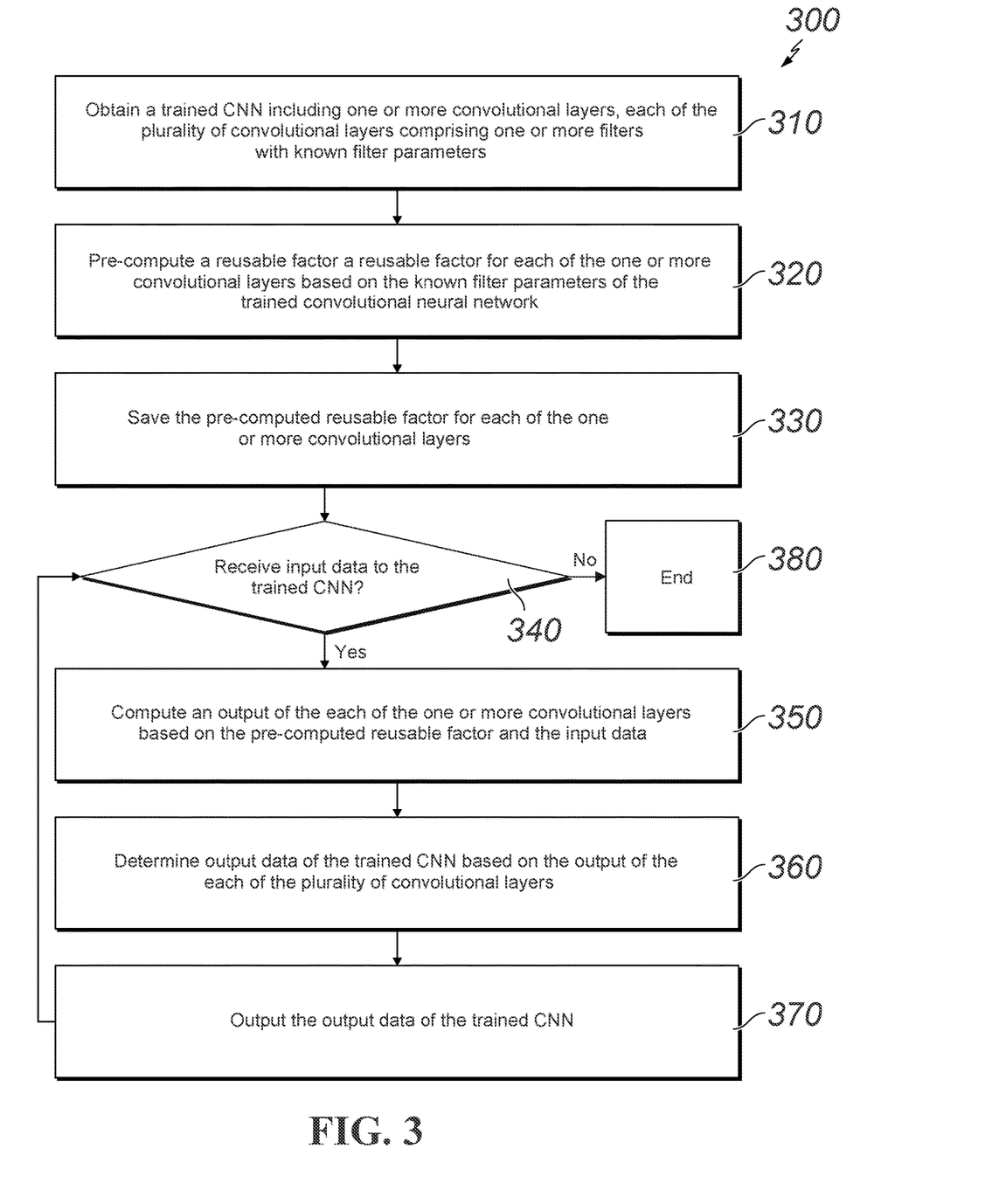
FIG. 3 is a flow chart illustrating an example method for fast computation of a CNN, according to an implementation of the present disclosure.

FIG. 3 is a flowchart of an example method 300 for fast computation of a CNN, according to an implementation. In some implementations, various steps of method 300 can be run in parallel, in combination, in loops, or in any order. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. For example, the method 300 can be performed by a data processing apparatus that is configured to execute machine learning algorithms using CNNs. The data processing apparatus can include or be implemented by one or more of, for example, general-purpose CPUs or hardware accelerators such as GPUs, FPGAs, and even custom ASIC processors.

At 310, a trained CNN is obtained. Obtaining a trained CNN can include, for example, computing the trained CNN through a training phase or process of a machine learning process (e.g., based on training data or sample inputs), retrieving the trained CNN from a memory or another data store, or receiving the trained CNN from another source (e.g., another data processing apparatus that performs the training process). The trained CNN can receive and analyze input data (e.g., an input image), and predict output data (e.g., respective probabilities of categories or classifications of the input image).

The trained CNN has a known network architecture (e.g., an ordered sequence of different layers) defined by known parameters of each layer in the trained CNN. Each layer in the trained CNN can operate on the input data to the trained CNN (either directly or by the virtue of operating on an output of a previous layer in the trained CNN). A layer that operates on data in the trained CNN prior to another layer is referred to as being a prior, previous, or upstream layer relative to the another layer. A layer that operates on data in the trained CNN following or after another layer's operation on data is referred to as a later or downstream layer relative to the another layer. Typically, an output of a prior layer is served as an input into the adjacent later layer. As such, the input data to the trained CNN go through each layer of the trained CNN in an order from the beginning of the CNN (e.g., an input layer that receives the input data or the initial layer that operates directly on the input data) to the ending of the CNN (e.g., an output layer that outputs a result of the CNN).

Particularly, the trained CNN includes one or more convolutional layers. Each of the one or more convolutional layers includes a respective one or more filters (or kernels) with known filter parameters (e.g., the number of filters, filter sizes, parameter values of the filter, and connection weights). Different convolutional layers may include the same or different number of filters. Each filter is defined by known filter parameters or weights. In some implementations, a filter can be represented by a matrix, such as the filter $\omega_{o,c} \in R^{r \times r}$ as described with respect to FIG. 2. The values of the filter matrix and connection weights are learned and known during the training process, and these values will not change when using the trained CNN, for example, for prediction based on input data. In some implementations, the filters and/or the connection weights of a convolutional layer can be collectively represented by a tensor. For example, each convolutional layer of the trained CNN can be represented by the filter matrices and a weight tensor (e.g., the tensor W as described with respect to FIG. 2) that includes parameters or weights of the filters or kernels of the CNN. From 310, method 300 proceeds to 320.

At 320, a reusable factor for each of the one or more convolutional layers can be pre-computed based on the known filter parameters of the trained CNN. For example, for each of the one or more convolutional layers, a reusable factor that only depends on known, unchanged parameters can be identified and computed independently of any input data to the CNN. For example, the tensor U, as described with respect to the example algorithm 200 in FIG. 2, is an example of the reusable factor for each of the one or more convolutional layers of the trained CNN. The tensor U can be computed according to steps 1-6 of the example algorithm 200 because all the parameters needed for such a computation (e.g., W and $\omega_{o,c}$) are known given the trained CNN and remain unchanged during the prediction phase based on the trained CNN.

In some implementations, pre-computing a reusable factor for each of the one or more convolutional layers based on the known filter parameters of the trained CNN includes computing the reusable factor for each of the one or more convolutional layers based on the known filter parameters of the trained CNN offline regardless of the input data to the trained CNN. As a result, for each convolutional layer of the trained CNN, the reusable factor only needs to be computed once, for example, by offline processing and can be retrieved and reused during runtime computation. From 320, method 300 proceeds to 330.

At 330, the pre-computed reusable factor for each of the one or more convolutional layers can be saved, for example, in a data store for ease of later retrieval when using the trained CNN, for example, for prediction. In some implementations, the saved pre-computed reusable factor can be shared, published or otherwise transmitted to other data processing devices. From 330, method 300 proceeds to 340.

At 340, a determination is made as to whether input data to the trained CNN are received. In response to determining that input data to the trained CNN are received, method 300 proceeds to 350. Otherwise, if it is determined that no input data to the trained CNN are received, method 300 proceeds to 380, where method 300 stops.

The input data can include, for example, image data of one or more images (e.g., a photo including a face of a person), or other types of input data. Each image can include one or more channels. For example, an image from a standard digital camera can be regarded as having three channels red, green and blue. One the other hand, a grayscale image can be regarded as having a single channel.

In some implementations, the input data can be represented by a tensor that can include scalars, vectors, matrices, and high-dimensional tensors. As an example, a grayscale image can be represented by a 2d matrix of pixel values. The value of each pixel in the matrix can range, for example, from 0 to 255, with zero indicating black and 255 indicating white. In some implementations, the value of each pixel is normalized by dividing it by 255. Each channel of a color image can include a 2d matrix having pixel values, for example, in the range 0 to 255 or in the range 0 to 1.0 after normalization. The 2d-matrices stacked over each other (one for each color) can form a tensor that represents the color image. In some implementations, the image data can include a tensor that includes multiple images.

For example, the input tensor X as described with respect to the example algorithm 200 in FIG. 2 is an example of the input data. The input data can be divided into sub-blocks or channels, for example, according to the techniques as described with respect to the example algorithm 200. The convolution operation can be performed on each of the sub-blocks or channels of the data, for example, according to the Winograd algorithm or another method.

In some implementations, the input data to CNN can go through each layer of the trained CNN according to the known network architecture of the trained CNN. From 340, method 300 proceeds to 350.

At 350, an output of the each of the one or more convolutional layers (say, Layer k) is computed based on the pre-computed reusable factor and the input data. The output of the Layer k includes a result of a convolution operation performed between an input to the Layer k and the filters of the Layer k. The input to the Layer k can include the input data to the trained CNN, an output of a previous layer (e.g., Layer k−1) of the trained CNN, or a combination of them. In some implementations, the output of the Layer k can be computed using a Winograd convolutional operator (e.g., the Wino-Conv2D 135 as described with respect to FIG. 1) based on the pre-computed reusable factor (e.g., the tensor U 125) and the input data (either directly or indirectly by the virtue of operating on the output of a previous layer). In some implementations, the output of the Layer k can be computed according to the Winograd minimal filtering algorithm (e.g., the example algorithm 200 described with respect to FIG. 2). From 350, method 300 proceeds to 360.

At 360, output data of the trained convolutional network is determined based on the output of the each of the one or more convolutional layers. In some implementations, determining output data of the trained convolutional network includes generating, predicting, or otherwise computing the output data of the trained CNN. The output data can include a prediction, classification, or other features or attributes derived from the input data by the operations of the trained CNN. For example, the output data can include a vector of probabilities of possible categories (e.g., a person, a dog, a car, or a tree) of the input image. As another example, the output data can include an identification of an object in the input image (e.g., for face recognition). As yet another example, the output data can include an identification or categorization of vehicular damages based on input photos of a vehicle. In some implementations, the output data can include an enhanced or filtered version of the input data (e.g., a sharpened or blurred version of an input photo).

In some implementations, the output data of the trained convolutional network are determined based on the output of the each of the one or more convolutional layers in that the output data of the trained convolutional network are determined based on one or more of the output of the each of the one or more convolutional layers (e.g., the output of the Layer k, for k∈[1, L], where L is the total number of the layers in the trained CNN. Typically, the output data of the trained convolutional network is determined based on the output of the last layer, Layer L, of the trained CNN, where the output of the Layer L is determined based on the output of the previous layer, Layer L−1, and so on, until tracing back to the input data to the trained CNN. In some implementations, the output data of the trained convolutional network can be determined based on the output of the each of the one or more convolutional layers in another manner. From 360, method 300 proceeds to 370.

At 370, the output data of the trained convolutional network can be output, for example, via a user interface (e.g., a graphical user interface). For example, the output data of the trained convolutional network can be represented in a table, a graph, a text, or another format and displayed to a user via a screen or another user interface. In some implementations, the output data of the trained convolutional network can be saved, transmitted, or otherwise output to another device (e.g., a storage device or another data processing apparatus for further processing).

From 370, method 300 goes back to 340 to determine if any input data (e.g., referred to as second input data) to the trained CNN are received. In some implementations, the second input data to the trained CNN can include additional or updated input data (e.g., another set of images) to the trained CNN for analyzing and prediction. Accordingly, method 300 can proceed to 350 for computing a second output of the each of the one or more convolutional layers based on the pre-computed reusable factor and the second input data; and then to 360 for determining second output data of the trained convolutional network based on the second output of the each of the one or more convolutional layers.

Figure 4:
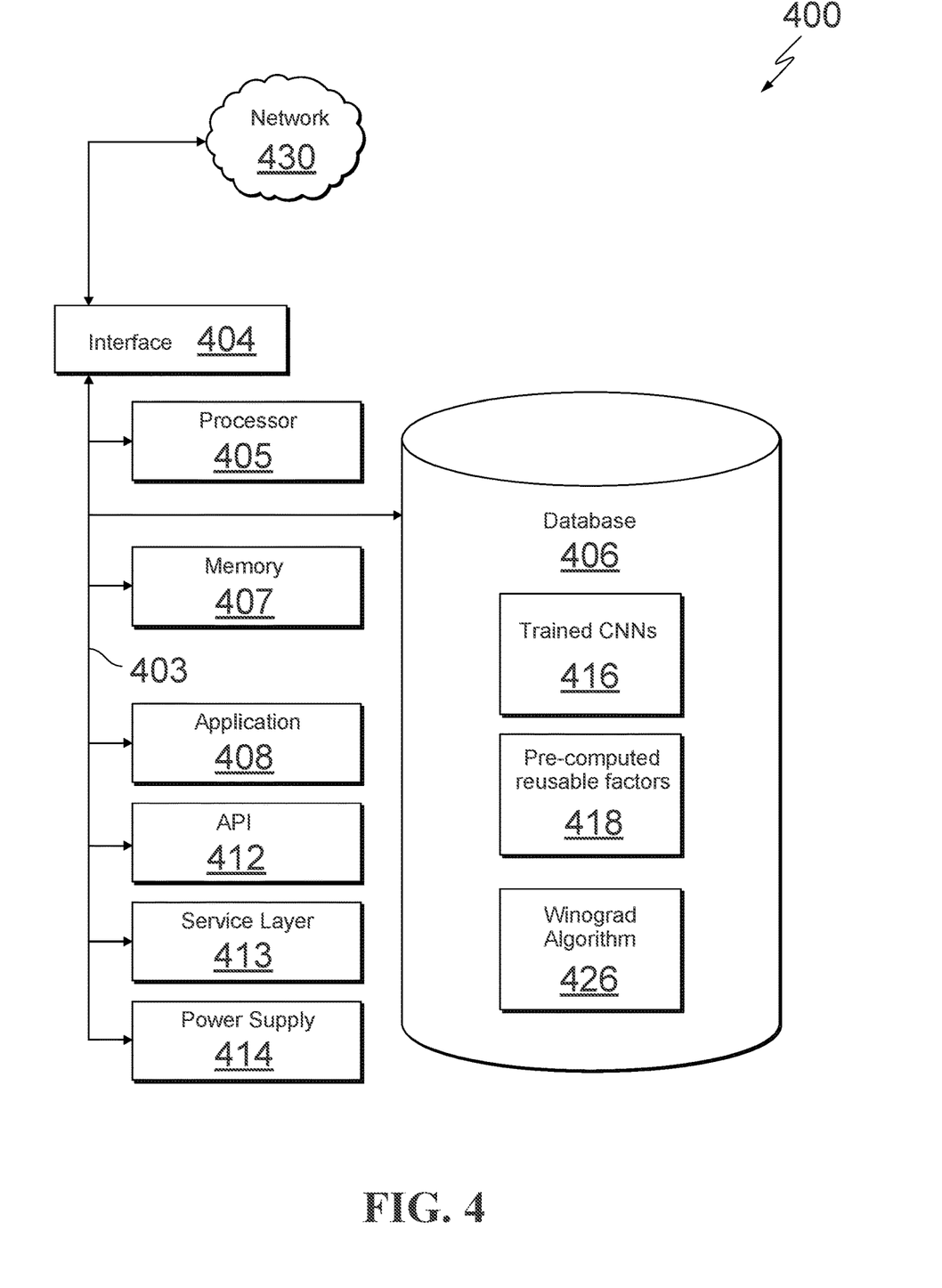
FIG. 4 is a block diagram illustrating an example computer system used to provide computational functionalities associated with described algorithms, methods, functions, processes, flows, and procedures as described in the instant disclosure, according to an implementation of the present disclosure.

FIG. 4 is a block diagram of an example computer system 400 used to provide computational functionalities associated with described algorithms, methods, functions, processes, flows, and procedures, as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may include a computer that includes an input device, such as a keypad, keyboard, touch screen, or other device that can accept user information, and an output device that conveys information associated with the operation of the computer 402, including digital data, visual, or audio information (or a combination of information), or a graphical-type user interface (UI) (or GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 includes logic encoded in software or hardware (or a combination of software and hardware) and is operable to communicate with the network 430. More specifically, the interface 404 may include software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds one or more trained CNNs 416, pre-computed reusable factors 418 of each convolutional layer of the one or more trained CNNs 416, and Winograd algorithm 426, for fast computation of a CNN.

The computer 402 also includes a memory 407 that can hold data for the computer 402 or other components (or a combination of both) that can be connected to the network 430 (whether illustrated or not). Memory 407 can store any data consistent with this disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method including: obtaining, by a data processing apparatus, a trained convolutional neural network including one or more convolutional layers, each of the one or more convolutional layers including a number of filters with known filter parameters; pre-computing, by the data processing apparatus, a reusable factor for each of the one or more convolutional layers based on the known filter parameters of the trained convolutional neural network; receiving, by the data processing apparatus, input data to the trained convolutional neural network; computing, by the data processing apparatus, an output of the each of the one or more convolutional layers using a Winograd convolutional operator based on the pre-computed reusable factor and the input data; and determining, by the data processing apparatus, output data of the trained convolutional network based on the output of the each of the one or more convolutional layers.

In a second implementation, a non-transitory, computer-readable medium storing one or more instructions executable by a computer system to perform operations including: obtaining a trained convolutional neural network including one or more convolutional layers, each of the one or more convolutional layers including a number of filters with known filter parameters; pre-computing a reusable factor for each of the one or more convolutional layers based on the known filter parameters of the trained convolutional neural network; receiving input data to the trained convolutional neural network; computing an output of the each of the one or more convolutional layers using a Winograd convolutional operator based on the pre-computed reusable factor and the input data; and determining output data of the trained convolutional network based on the output of the each of the one or more convolutional layers.

In a third implementation, a computer-implemented system, including: one or more computers; and one or more computer memory devices interoperably coupled with the one or more computers and having tangible, non-transitory, machine-readable media storing instructions, that when executed by the one or more computers, perform operations including: obtaining a trained convolutional neural network including one or more convolutional layers, each of the one or more convolutional layers including a number of filters with known filter parameters; pre-computing a reusable factor for each of the one or more convolutional layers based on the known filter parameters of the trained convolutional neural network; receiving input data to the trained convolutional neural network; computing an output of the each of the one or more convolutional layers using a Winograd convolutional operator based on the pre-computed reusable factor and the input data; and determining output data of the trained convolutional network based on the output of the each of the one or more convolutional layers.

The foregoing and other described implementations can each, optionally, include one or more of the following features:

A first feature, combinable with any of the following features, wherein pre-computing a reusable factor for each of the one or more convolutional layers based on the known filter parameters of the trained convolutional neural network includes computing the reusable factor for each of the one or more convolutional layers based on the known filter parameters of the trained convolutional neural network offline regardless of the input data to the trained convolutional neural network.

A second feature, combinable with any of the previous or following features, further including saving the pre-computed reusable factor for each of the one or more convolutional layers.

A third feature, combinable with any of the previous or following features, wherein computing an output of the each of the one or more convolutional layers based on the pre-computed reusable factor and the input data includes computing an output of the each of the one or more convolutional layers according to a Winograd minimal filtering algorithm with the pre-computed reusable factor and the input data.

A fourth feature, combinable with any of the previous or following features, wherein the input data to the trained convolutional neural network includes one or more images.

A fifth feature, combinable with any of the previous or following features, the method or the operations further including: receiving, by the data processing apparatus, second input data to the trained convolutional neural network; computing, by the data processing apparatus, a second output of the each of the one or more convolutional layers based on the pre-computed reusable factor and the second input data; and predicting, by the data processing apparatus, second output data of the trained convolutional network based on the second output of the each of the one or more convolutional layers.

A sixth feature, combinable with any of the previous or following features, the method or the operations further including outputting the output data of the trained convolutional network via a user interface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (convolutional layerI) that processes information and efficiently presents the information results to the user. In general, a GUI may include one or more user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and a server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
obtaining, by a data processing apparatus, a trained convolutional neural network comprising at least a first convolutional layer and a second convolutional layer, each of the at least the first convolutional layer and the second convolutional layer comprising a corresponding plurality of filters with known filter parameters;
pre-computing, by the data processing apparatus, a first reusable factor for the first convolutional layer based on the known filter parameters regardless of any input data to the trained convolutional neural network;
pre-computing, by the data processing apparatus, a second reusable factor for the second convolutional layer based on the known filter parameters regardless of any input data to the trained convolutional neural network;
identifying, by the data processing apparatus, a first input data to the first convolutional layer of the trained convolutional neural network;
computing, by the data processing apparatus, a first output of the first convolutional layer using a Winograd convolutional operator based on the first reusable factor and the first input data;
using, by the data processing apparatus, the first output as a second input data to the second convolutional layer of the trained convolutional neural network; and
computing, by the data processing apparatus, a second output of the second convolutional layer using the Winograd convolutional operator based on the second reusable factor and the second input data.

2. The computer-implemented method of claim 1, further comprising saving the first reusable factor for the first convolutional layer.

3. The computer-implemented method of claim 1, wherein computing a first output of the first convolutional layer using a Winograd convolutional operator based on the first reusable factor and the first input data comprises computing the first output of the first convolutional layer according to a Winograd minimal filtering algorithm with the first reusable factor and the first input data.

4. The computer-implemented method of claim 1, wherein the first input data to the trained convolutional neural network comprises one or more images.

5. The computer-implemented method of claim 1, further comprising:

determining, by the data processing apparatus, output data of the trained convolutional neural network based on the second output of the second convolutional layer.

6. The computer-implemented method of claim 1, further comprising outputting output data of the trained convolutional neural network via a user interface.

7. A non-transitory, computer-readable medium storing one or more instructions executable by a computer system to perform operations comprising:
obtaining a trained convolutional neural network comprising at least a first convolutional layer and a second convolutional layer, each of the at least the first convolutional layer and the second convolutional layer comprising a corresponding plurality of filters with known filter parameters;
pre-computing a first reusable factor for the first convolutional layers based on the known filter parameters regardless of any input data to the trained convolutional neural network;
pre-computing a second reusable factor for the second convolutional layer based on the known filter parameters regardless of any input data to the trained convolutional neural network;
identifying a first input data to the first convolutional layer of the trained convolutional neural network;
computing a first output of the first convolutional layer using a Winograd convolutional operator based on the first reusable factor and the first input data;
using the first output as a second input data to the second convolutional layer of the trained convolutional neural network; and
computing a second output of the second convolutional layer using the Winograd convolutional operator based on the second reusable factor and the second input data.

8. The non-transitory, computer-readable medium of claim 7, the operations further comprising saving the first reusable factor for the first convolutional layer.

9. The non-transitory, computer-readable medium of claim 7, wherein computing a first output of the first convolutional layer using a Winograd convolutional operator based on the first reusable factor and the first input data comprises computing the first output of the first convolutional layer according to a Winograd minimal filtering algorithm with the first reusable factor and the first input data.

10. The non-transitory, computer-readable medium of claim 7, wherein
the first input data to the trained convolutional neural network comprises one or more images.

11. The non-transitory, computer-readable medium of claim 7, the operations further comprising:
determining output data of the trained convolutional neural network based on the second output of the second convolutional layer.

12. The non-transitory, computer-readable medium of claim 7, the operations further comprising outputting output data of the trained convolutional neural network via a user interface.

13. A computer-implemented system, comprising:
one or more computers; and
one or more computer memory devices interoperably coupled with the one or more computers and having tangible, non-transitory, machine-readable media storing instructions, that when executed by the one or more computers, perform operations comprising:
obtaining a trained convolutional neural network comprising at least a first convolutional layer and a second convolutional layer, each of the at least the first convolutional layer and the second convolutional layer comprising a corresponding plurality of filters with known filter parameters;

pre-computing a first reusable factor for the first convolutional layer based on the known filter parameters regardless of any input data to the trained convolutional neural network;

pre-computing a second reusable factor for the second convolutional layer based on the known filter parameters regardless of any input data to the trained convolutional neural network;

identifying a first input data to the first convolutional layer of the trained convolutional neural network;

computing a first output of the first convolutional layer using a Winograd convolutional operator based on the first reusable factor and the first input data;

using the first output as a second input data to the second convolutional layer of the trained convolutional neural network; and computing a second output of the second convolutional layer using the Winograd convolutional operator based on the second reusable factor and the second input data.

14. The computer-implemented system of claim 13, the operations further comprising saving the first reusable factor for the first convolutional layer.

15. The computer-implemented system of claim 13, wherein computing a first output of the first convolutional layers using a Winograd convolutional operator based on the first reusable factor and the first input data comprises computing the first output of the first convolutional layer according to a Winograd minimal filtering algorithm with the first reusable factor and the first input data.

16. The computer-implemented system of claim 13, the operations further comprising:

determining output data of the trained convolutional neural network based on the second output of the second convolutional layer.

17. The computer-implemented system of claim 13, further comprising a user interface; and the operations further comprising outputting output data of the trained convolutional neural network via the user interface.

* * * * *

UNITED STATES PATENT AND TRADEMARK OFFICE
CERTIFICATE OF CORRECTION

PATENT NO. : 10,635,951 B1
APPLICATION NO. : 16/390042
DATED : April 28, 2020
INVENTOR(S) : Yongchao Liu et al.

Page 1 of 1

It is certified that error appears in the above-identified patent and that said Letters Patent is hereby corrected as shown below:

In the Claims

In Claim 7, in Column 20, Line 17, delete "layers" and insert -- layer --, therefor.

In Claim 15, in Column 22, Line 7, delete "layers" and insert -- layer --, therefor.

Signed and Sealed this
Seventh Day of July, 2020

Andrei Iancu
*Director of the United States Patent and Trademark Office*